Jan. 8, 1963    C. GEHLSEN    3,072,885
EMERGENCY LAMP FOR A MOTOR VEHICLE
Filed July 24, 1961
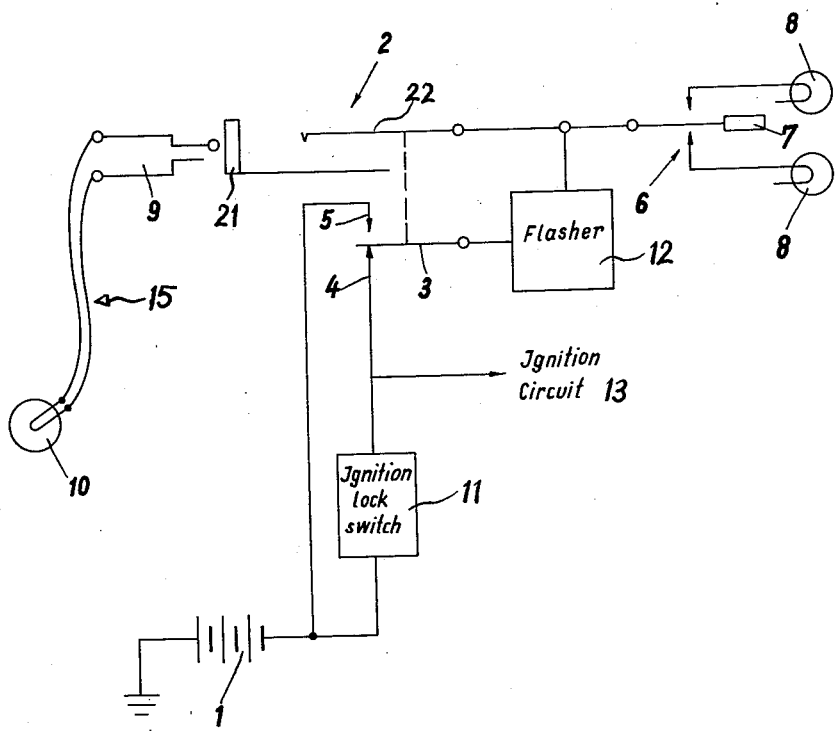
Inventor:
Carlheinz Gehlsen
By Hans Berman
Agent

3,072,885
EMERGENCY LAMP FOR A MOTOR VEHICLE
Carlheinz Gehlsen, Quinckestrasse 37,
Heidelberg, Germany
Filed July 24, 1961, Ser. No. 126,157
Claims priority, application Germany July 27, 1960
4 Claims. (Cl. 340—72)

This invention relates to motor vehicles, and is more particularly concerned with a flashing emergency light intended to warn approaching vehicles of the presence of a stationary automotive vehicle and the like.

Known warning lights for use with stationary obstacles on public roads such as motor cars in need of repair service are of several types. A first type is independent of the vehicle and contains its own power source, usually a dry cell battery. It is a common experience to find the battery exhausted or otherwise unable to furnish current when an emergency arises. A second type employs the electric current sources which are necessarily available in a motor car or truck, the flasher unit employed for energizing the directional lights, and these lights themselves to give an emergency signal. Since the directional lights are mounted on the vehicle, they cannot be placed to warn a motorist approaching on a road on which vision is obstructed by curves and the like. Similar limitations apply to other types of known emergency warning lamps.

This invention is directed to an emergency lamp for motor vehicles and the like which is powered by the electric current source of the vehicle itself.

Another object is the provision of an emergency lamp which emits a flashing signal.

A further object is the provision of such an emergency lamp which may be placed at a distance from the distressed vehicle for improved visibility.

Other objects and many of the attendent advantages of this invention will be readily appreciated as the same becomes better understood by reference to the following detailed description when considered in connection with the accompanying drawing the sole figure of which diagrammatically illustrates the electrical circuit of a preferred embodiment of the invention.

The drawing includes conventional elements of the electrical system of a motor car, not otherwise illustrated, which is at least in part energized by a battery 1. The motor car will be understood to include a generator, a voltage regulator and other devices conventionally employed to keep the battery charged in normal operation of the vehicle.

One pole of the battery 1 is ground to the metal frame of the vehicle in the usual manner, and the current consuming devices on the car are similarly grounded. The other pole of the battery is conductively connected to the ignition lock switch 11 of the car which is a selector switch adapted to actuate the several electrical circuits of the car in a known manner not requiring further illustration. The switch is interposed between the battery 1 and the ignition circuit 13 of the vehicle motor which includes the usual induction coil, condenser, distributor, spark plugs, and conductors connecting the several elements of the ignition circuit which are not in themselves relevant to this invention, and are are not shown in detail in the drawing.

The motor car is also equipped with directional lights 8 of which two are shown for the sake of illustration. A single-pole double-throw switch 6 is interposed between the lights 8 and a conventional flasher unit 12 which may be of the bi-metal type in which a normally closed switch (not shown) has a bi-metal movable contact which is heated by the passage of current, and distorted by the current-generated heat to break contact with a fixed contact element, whereupon the bi-metal contact is cooled by heat loss, and contact is restored. The flasher unit 12 is normally connected to the battery 1 through the ignition lock switch 11 in such a manner that the directional lights cannot be energized unless the ignition circuit is simultaneously energized. The switch 6 has an actuating handle 7 which permits the lights 8 to be selectively actuated. The handle 7 is conventionally mounted on or near the steering wheel of the car (not shown).

A telephone type jack 2 is mounted on the car, and preferably on the dashboard or in another readily accessible location inside the car body. It constitutes a two-pole outlet connector one pole 21 of which is grounded to the motor car frame. A movable contact blade 22 of the jack 2 is mechanically linked with the movable contact 3 of a single-pole single-throw switch built into the jack 2 and connected to the input terminal of the flasher unit 12. The contact blade 3 is resiliently biased normally to make contact with a stationary contact 4 arranged in series with the ignition lock switch and the battery 1, and may be moved into engagement with a stationary contact 5 directly connected to the battery 1.

An emergency lamp 10, preferably having a colored glass envelope and equipped with a suitable support structure not further illustrated, is connected with a two-pole plug 9 of a shape mating the outlet connector of the jack 2. The connection is made by a two conductor cable 15. The cable is preferably of a length of thirty feet or more so that the lamp 10 may be placed at an adequate distance from a disabled car while the plug 9 is inserted in the jack 2 on the car dashboard.

Insertion of the plug into the jack displaces the contact blade 22, and moves the contact 3 from the normal position illustrated into a position of engagement with the stationary contact 5, thereby interrupting the series connection between the flasher unit 12, the battery 1 and the ignition lock switch 11, as well as the connection between the flasher unit and the ignition circuit 13. The flasher unit 12 is now directly connected to the battery 1 and feeds pulses of energizing current to the emergency lamp 10 regardless of the condition of the ignition circuit. The directional lights may simultaneously be energized by means of the switch 6 to furnish additional warning signals.

The apparatus illustrated does not depend on special power sources which may deteriorate without warning when not in use, and may not be available in an emergency. The portable elements of the emergency signalling arrangement are light in weight and have a minimum of bulk so as to be easy to store when not in use. They are simple and insensitive to damage by careless handling if the lamp 10 is adequately protected. Accidental breakage of the lamp 10 is readily apparent, and the lamp may be replaced.

The power supply of the unit is the battery of the motor car itself which can furnish adequate current for energizing an emergency lamp of practical power requirements for a very long time even if the battery should be too weak to energize the starter motor of the car. The circuit illustrated permits the emergency light to be operated by the battery when the car is disabled by a short circuit in its ignition system. The directional lights of the car may be employed to provide supplemental warning signals without keeping the ignition circuit energized. The emergency signals are operative when a disabled car is temporarily abandoned and the ignition key is removed.

The emergency lamp of the invention thus is simple and inexpensive in first cost, and very reliable in its operation under those conditions in which its operativeness may affect the safety of human lives.

While the emergency lamp of the invention has merely been illustrated in the wiring diagram of the drawing as an electric light bulb having two terminals, the lamp may be equipped with a housing, a reflector, and a stand to hold it at any desired vertical distance from a supporting surface, such as a road surface, in a manner well known in itself.

Obviously, many other modifications and variations of the present invention are possible in the light of the above teachings. It is therefore to be understood that within the scope of the appended claims the invention may be practiced otherwise than as specifically described.

What I claim is:

1. In a motor car, in combination:
   (a) a source of electric current;
   (b) a flasher unit;
   (c) an ignition lock switch normally interposed between said source of electric current and said flasher unit;
   (d) an outlet connector in series circuit with said source and said unit, and normally in series circuit with said ignition lock switch;
   (e) an electrically operated lamp;
   (f) plug means releasably connectable to said outlet connector;
   (g) circuit means interposed between said lamp and said plug means for flashing actuation of said lamp by said source of electric current when said plug means is connected to said outlet connector;
   (h') an ignition circuit connected to said ignition lock switch in parallel with said flasher unit; and
   (h'') switch means responsive to the connecting of said plug means to said outlet connector for disconnecting said flasher unit from said ignition lock switch and said ignition circuit while maintaining the circuit between said source of current and said flasher unit.

2. In a motor car as set forth in claim 1, said connector being mounted on said car, and said circuit means including a conductor of a length sufficient to connect said lamp to said connector when the lamp is spaced from the car.

3. In a motor car as set forth in claim 1, at least one directional light; and switch means interposed between said flasher unit and said directional light for selectively connecting said light in series with said current source and said flasher unit and in parallel with said outlet connector.

4. In a motor car, in combination:
   (a) a source of electric current;
   (b) a flasher unit;
   (c) an ignition lock switch normally interposed between said source of electric current and said flasher unit;
   (d) an outlet connector in series circuit with said source and said unit, and normally in series circuit with said ignition lock switch;
   (e) an electrically operated lamp;
   (f) plug means releasably connectable to said outlet connector;
   (g) circuit means interposed between said lamp and said plug means for flashing actuation of said lamp by said source of electric current when said plug means is connected to said outlet connector; and
   (h) switch means responsive to the connecting of said plug means to said outlet connector for disconnecting said flasher unit from said ignition lock switch while maintaining the circuit between said source of current and said flasher unit.

References Cited in the file of this patent

UNITED STATES PATENTS

| | | |
|---|---|---|
| 2,141,210 | Foulks | Dec. 27, 1938 |
| 2,667,602 | Fleming | Jan. 26, 1954 |
| 2,987,702 | Yohe | June 6, 1961 |